US008909470B2

(12) United States Patent
Denk

(10) Patent No.: US 8,909,470 B2
(45) Date of Patent: Dec. 9, 2014

(54) OPTICAL OBSERVATION DEVICE FOR TARGET ACQUISITION AND NAVIGATION

(71) Applicant: Leica Camera AG, Solms (DE)

(72) Inventor: Robert Denk, Braunfels (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 13/768,197

(22) Filed: Feb. 15, 2013

(65) Prior Publication Data
US 2013/0253820 A1 Sep. 26, 2013

(30) Foreign Application Priority Data

Feb. 16, 2012 (DE) .......................... 10 2012 003 124

(51) Int. Cl.
G02B 23/18 (2006.01)
G01C 3/04 (2006.01)
G02B 23/10 (2006.01)
G01S 17/02 (2006.01)
G01C 21/00 (2006.01)
G01S 5/02 (2010.01)

(52) U.S. Cl.
CPC ................ *G01C 21/00* (2013.01); *G02B 23/10* (2013.01); *G01S 17/023* (2013.01); *G01S 5/0284* (2013.01); *G02B 23/18* (2013.01); *G01C 3/04* (2013.01)
USPC ........................................................ 701/433

(58) Field of Classification Search
CPC ...................................................... G02B 23/18
USPC ................................. 701/433, 491, 526, 541
See application file for complete search history.

(56) References Cited

U.S. PATENT DOCUMENTS 5,483,336 A * 1/1996 Tocher .......................... 356/3.15
5,579,165 A 11/1996 Michel et al.
5,672,820 A * 9/1997 Rossi et al. .................. 73/178 R
(Continued)

FOREIGN PATENT DOCUMENTS

DE 37 04 848 C2 10/1992
DE 692 21 700 T2 1/1998
(Continued)

OTHER PUBLICATIONS

JPO machine translation of JP 2009-109415 (original JP document published May 21, 2009).*
(Continued)

Primary Examiner — Behrang Badii
Assistant Examiner — David Testardi
(74) Attorney, Agent, or Firm — Foley & Lardner LLP

(57) ABSTRACT

An optical observation device for target acquisition and navigation having at least one objective, which is to be turned toward the object to be observed, and at least one ocular, which is to be turned toward the eye of the observer, in a housing, wherein the housing has at least one image reversal system, means for range finding, for location/position determination, for determination of the compass direction, and for displaying data, is distinguished in that an integrated target acquisition module having optoelectronic rangefinder, a GPS position determination, an electronic compass direction determination, and a microcomputer unit for calculating and storing distance and location coordinates of a targeted destination, an integrated navigation module having a display screen, which is arranged externally on the housing, and actuating elements, which are arranged on the housing, for activating functions of the target acquisition and navigation module are provided.

12 Claims, 2 Drawing Sheets

(56) References Cited

U.S. PATENT DOCUMENTS

| | | | |
|---|---|---|---|
| 5,825,480 A * | 10/1998 | Udagawa | 356/138 |
| 6,480,148 B1 * | 11/2002 | Wilson et al. | 342/357.32 |
| 7,184,885 B2 * | 2/2007 | Watanabe | 701/533 |
| 7,295,296 B1 * | 11/2007 | Galli | 356/139.01 |
| 7,609,316 B2 * | 10/2009 | Chien | 348/341 |
| 7,658,031 B2 * | 2/2010 | Cross et al. | 42/142 |
| 7,999,924 B2 * | 8/2011 | Watanabe | 356/5.01 |
| 8,033,464 B2 | 10/2011 | Windauer et al. | |
| 8,390,721 B2 * | 3/2013 | Liu et al. | 348/335 |
| 2001/0023387 A1 * | 9/2001 | Rollo | 701/200 |
| 2004/0119020 A1 | 6/2004 | Bodkin | |
| 2006/0077375 A1 | 4/2006 | Vermillion et al. | |
| 2008/0039962 A1 | 2/2008 | McRae | |
| 2008/0163504 A1 * | 7/2008 | Smith et al. | 33/268 |
| 2009/0306892 A1 * | 12/2009 | Malka et al. | 701/213 |
| 2009/0312944 A1 * | 12/2009 | King | 701/207 |
| 2011/0021293 A1 | 1/2011 | York et al. | |
| 2011/0121159 A1 | 5/2011 | Mourar et al. | |
| 2012/0109577 A1 * | 5/2012 | Nyhart et al. | 702/159 |
| 2013/0046461 A1 * | 2/2013 | Balloga | 701/438 |

FOREIGN PATENT DOCUMENTS

| | | | | |
|---|---|---|---|---|
| DE | 20111501 U1 * | 10/2001 | | G01C 17/00 |
| DE | 10 2006 040 082 A1 | 3/2007 | | |
| JP | 2002-236259 A | 8/2002 | | |
| JP | 2009109415 A * | 5/2009 | | |
| WO | WO 2005/060666 A2 | 7/2005 | | |

OTHER PUBLICATIONS

Gun Dog Supply, "Garmin® ASTRO DC-40 GPS Dog Tracking Collars Review", Jan. 19, 2012, 14 pages, downloaded from http://www.gundogsupply.com/garmin-astro-gps-dog-tracking-collars-reviews.html.*

Garmin "GPS 16 and GPS 17" brochure, Specification Sheet, 2 pages, 2005, downloaded from http://www8.garmin.com/specs/GPS_16_17spec_sheet_0805.pdf.*

EPO machine translation of DE 20111501 (original DE U1 document published Oct. 18, 2001).*

Garmin, Foretrex 301 and 401 personal Navigator Owner's Manual, 2009, 40 pages.

* cited by examiner

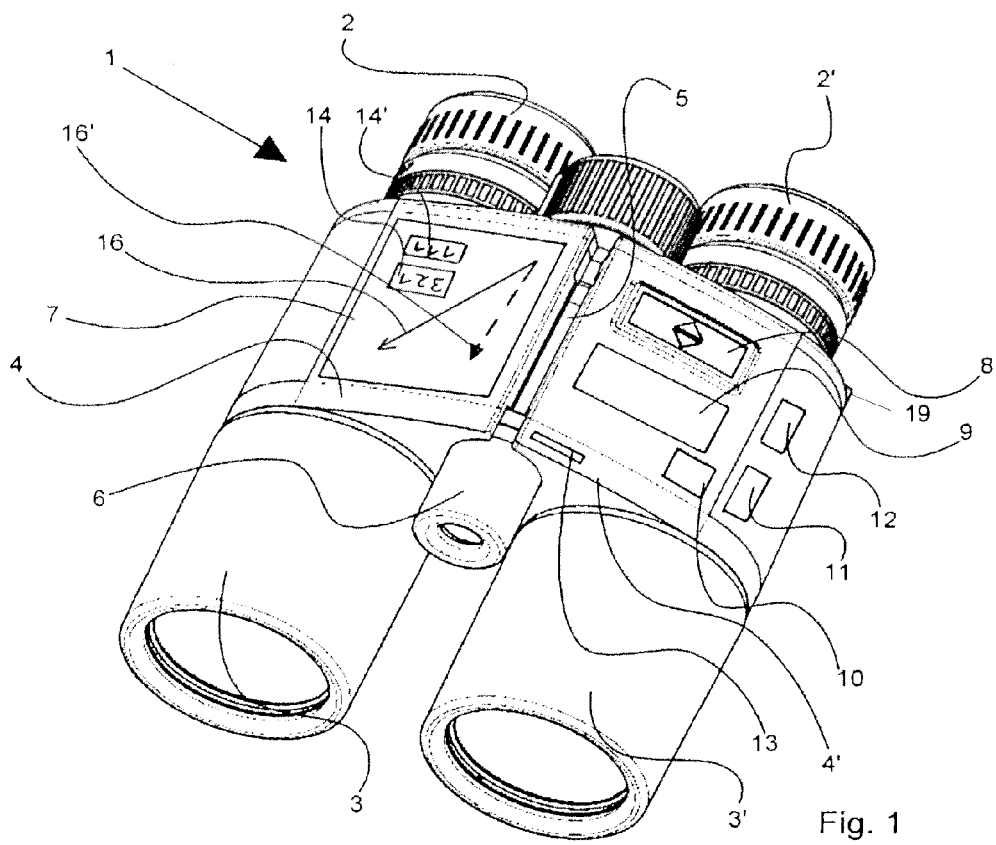
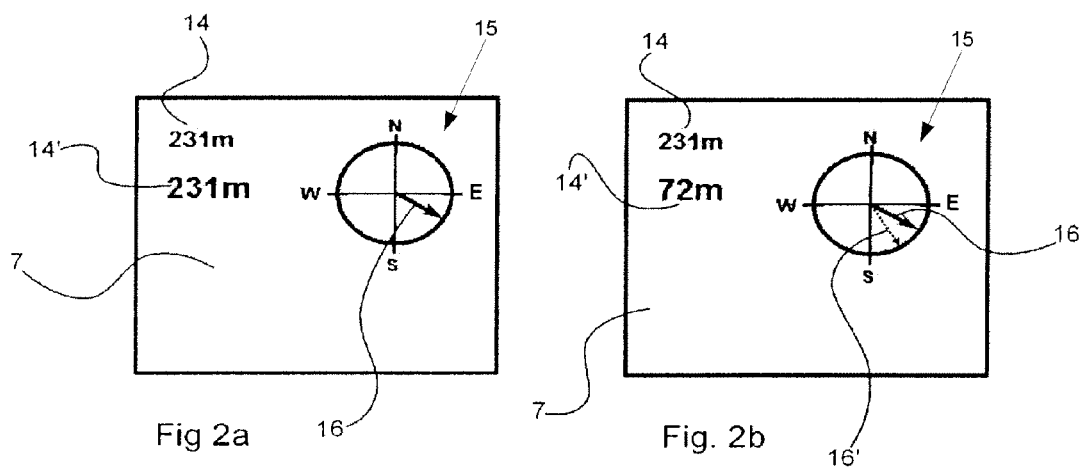

OPTICAL OBSERVATION DEVICE FOR TARGET ACQUISITION AND NAVIGATION

CROSS-REFERENCE TO RELATED PATENT APPLICATIONS

The right of foreign priority is claimed under 35 U.S.C. §119(a) based on Federal Republic of Germany Application No. 10 2012 003 124.6, filed Feb. 16, 2012, the entire contents of which, including the specification, drawings, claims and abstract, are incorporated herein by reference.

BACKGROUND OF THE INVENTION

The invention relates to an optical observation device for target acquisition and navigation and a method for target acquisition and navigation.

SUMMARY OF THE INVENTION

Manifold optical observation devices, e.g., monocular and binocular field glasses, telescopes, and also telescopic sights with integrated range finding are known. Using these devices, while simultaneously observing an object, precise range finding thereto is possible. So-called laser rangefinder field glasses offer the possibility of binocular observation, while simultaneously displaying a destination and a measured distance by reflecting a display in the observation beam path. An objective of the field glasses is typically used as the receiving objective for the laser rangefinder, to ensure the best possible correspondence of the actual measured target object with the reflected destination, which is superimposed in the object space. A further objective or a separate transmission tube is necessary to project the measuring beam generated by the laser transmitter into the object space to be measured.

By way of example, such a binocular observation device, specifically binocular field glasses, is known from DE 37 04 848 C2, in which the range finding is performed using already existing optical components. Therefore, the traditional field glass or telescope functions are integrated in the device, which allow a direct observation of an object, as well as the range finding integrated in the observation beam path, as well as a directional display integrated in the device, whose result is additionally projected into the observation beam path.

One objective of the binoculars is used for the laser beam projection, while the second objective represents the receiving optic of the laser rangefinder receiver. Both beam paths are arranged in a fixed assignment in a housing without a bending bridge function for eye width adjustment. The laser beams are reflected in and out as the display is reflected in on optical splitting layers of the prisms, which are arranged between objective and ocular, of the left and right image reversal system. Measured values can therefore only be acquired by the user as long as the binoculars are placed in the observation usage position on the eyes and a measurement is carried out. Finding a previously observed destination is not possible using this device, the user must note measured data and results to be able to use them later.

A method for determining an unknown geographic destination and binoculars having a field of vision are known from DE 10 2006 040 082 A1, using which binoculars an object can be located and observed. With the aid of a GPS measuring unit and a measuring device for determining the location, the coordinates of an object located in the field of vision of the binoculars are displayed with the aid of an integrated display.

A system is known from JP 2002-236259 A, using which the position data of an object are provided in binoculars. The binoculars can be aligned for the acquisition of the object in the field of vision while employing these data.

A laser rangefinder is known from US 2006/0077375 A1, using which, in consideration of a distance ascertained to a target and in consideration of a measured inclination to the target, a second distance is ascertained and internally displayed. A switch is arranged on the housing of the device for activating the functions.

An optical observation device is known from DE 692 21 700 T2, in which a second, for example, electronically generated image having symbolic elements is superimposed on an internal first observation image. The device has externally arranged actuating elements for the activation of various functions.

The invention is therefore based on improving the prior art, making handling easier, and in particular improving the suitability for the hunting field through a navigation function.

A further aspect of the invention is the reduction of production costs, while simultaneously increasing the utility for the user.

In an observation device of the type mentioned at the beginning, this is achieved according to the invention by the characterizing features described below and by a method having the features described below.

The invention is based on the finding that through modular construction while utilizing the components and component groups provided in existing optical observation devices, further functions of high utility for the user are implementable without significantly increasing the production costs. The expansion of existing devices, which have already been developed in a space-saving manner under difficult construction space conditions, is not readily possible, however.

A further aspect of the invention is to make measured data, which are otherwise only available in the internal display screen in the typical usage position, namely on the eye of the observer, usable for a further use, for example, navigation which is required following the destination measurement. With an observation device placed on the eyes, the user cannot move toward a target without the danger of falling over obstructions.

One aspect of the invention is, in the case of the optical observation devices mentioned, in particular in the case of monocular and binocular field glasses having integrated laser range finding, to group the internal components in modules and to provide additional functions in a simple-to-operate manner.

According to aspects of the invention, the optical observation device, in particular binocular laser range finder field glasses or a monocular rangefinder, therefore has an integrated target acquisition module and integrated navigation module having actuating elements arranged externally on the housing.

Switches, in particular pressure switches or buttons for activating functions of the target acquisition and navigation module, are preferably provided as the actuating elements.

The target acquisition module has, inter alia, an optoelectronic range finder and a display screen, which can be observed through the ocular, for displaying a target mark and a measured target distance. A GPS position determination, using which the current position of the observer or the device, respectively, can be ascertained is also integrated, while the alignment of the device, that is the observation direction, is ascertained using an electronic compass. In addition, the angle of inclination of the device in the observation direction can be acquired using an inclination sensor. The distance, position, and directional data measured and generated in this manner are used in a microcomputer unit to store the measured target distance and to calculate the location coordinates of a targeted destination. An air pressure detection sensor can be used for altitude determination and supplementary comparison with GPS data for improved precision of the location determination. The previously ascertained angle of inclination can additionally be used to improve the target determination. These functions are advantageous in particular in the mountains, in which the destination is often located above or below the current position.

The integrated navigation module has a display screen, which is arranged externally on the housing, for displaying a target direction vector, which is calculated from the currently ascertained GPS position coordinates of the observation device and the stored location coordinates of the destination, and a resulting current target distance.

In a particularly advantageous manner, at least one pressure switch, which is arranged externally on the housing, is provided as the actuating element, using which the microcomputer unit is activatable by a first switch actuation, and subsequently the distance, directional, and inclination measurements, temperature measurement, and, for example, air pressure measurement are carried out. Additionally or alternatively thereto, a proximity sensor can be arranged in the ocular region, which activates the microcomputer unit for the range finding when the observation device is moved toward the eyes. A comparable alternative is to provide an integrated inclination sensor and use it to generate a switch signal. The switch signal can, e.g., be generated by detecting an attitude change from a predominantly vertical position of the device into the nearly horizontal usage position, in which it is placed on the eyes of the user. The GPS position determination can be activated continuously during the target acquisition, to bring the position data in the internal display screen to display, on the one hand, and to have them available immediately for further calculation, on the other hand. For energy-saving purposes, the GPS position determination can alternatively also first be activatable by pressing a button on a further switch. In the usage position, which is pressed against the eye, after successful target acquisition, by repeated, for example, long actuation of the switch, the calculation and automatic storage of the distance and the location coordinates of the destination are activated, wherein direction, inclination, and air pressure can also be stored. In addition, this function can be coupled to a predominantly unchanged horizontal position of the observation device. The activation of the laser range finding and optionally also the GPS position determination can also be suppressed depending on a state change of the proximity sensor (device is moved away from the eye) or the inclination sensor (device is moved from horizontal to vertical). In this manner, incorrect measurements can be prevented and electrical power can be saved.

In order to also ensure the usage of the device in the dark, the external display screen of the navigation module is provided with a light. Since an illuminated display screen is also visible far away, in particular in the darkness, however, and irritates the game to be observed in the hunting field, for example, it has proven to be advantageous to deactivate the navigation module and its display screen during the target acquisition, also for energy-saving purposes, and only to illuminate them for the navigation.

In an advantageous manner, in the case of an optical observation device according to the invention, the navigation module and its display screen are first activated by actuating a further pressure switch arranged externally on the housing. In this manner, it is ensured that the display screen is not unintentionally turned on and the light annoys the user. Alternatively, by accepting the possible unintentional lighting of the display screen to increase the comfort for the user, after completion of the target acquisition, the navigation module can be automatically activated by the detection of a change of the state of the proximity sensor. In this manner, it is possible that the user, as soon as he removes the observation device from the eye and, for example, holds it in front of his chest to study the display screen, immediately has available the required information to find the destination. The display screen can reasonably be temporarily deactivated in the event of an inclination change detected using the inclination sensor, which makes an observation of the display impossible, e.g., in the case in which the user hangs the binoculars in front of his chest. The activation of the display depending on the attitude, or inclination change, respectively, is also reasonable in the case of a monocular embodiment of the observation device according to the invention. In particular compact device embodiments are often designed as narrow and only have space for operating elements on the surface which is on top in the usage position. In such monocular observation devices, the display screen is arranged on a lateral face. The device must, so that the display screen is visible from above, be pivoted about its optical axis by approximately 90°. This pivot movement can preferably be detected using an inclination sensor and the display screen can be activated as a function of a substantially horizontal alignment. In the event of a subsequent further, preferably horizontal alignment of the device, which is suitable for navigation, and in which the display screen is visible from above by the user, the display is reactivated. The brightness of the display screen can additionally be regulated with the aid of an ambient light sensor.

For the navigation, the direction is advantageously displayed in the form of an arrow and the distance to the destination is displayed as a numeric value in the display screen. For the user, the unit of measure is individually settable in meters or yards, for example. If the user now moves toward the destination on the basis of the displayed data, the display of the target arrow and the target distance are displayed continuously updated on the display screen on the basis of current location and compass data of the observation device. The simultaneous display of the original target distance to the destination and the current remaining distance to the destination as numeric values is of particularly great user utility. A graphic representation, for example, on the basis of a bar display, which decreases down to zero as the target is approached, can be evaluated particularly simply by the user. The display of the currently taken (possibly incorrect) movement direction by a small displayed arrow as a comparative display and a simultaneous significantly larger arrow display, which has a different color or is larger, and which corresponds to the direction toward the destination, is particularly expedient.

To further elevate the user value, the microprocessor of the optical observation device is configured to calculate ballistic correction data. The inclination sensor and also further sensors, which are required for the calculation or are supplementary, respectively, e.g., air pressure, ambient humidity, and temperature sensors, are integrated in the housing. The respective measured data, in particular the distance and the angle of inclination, are used to calculate ballistic correction data. The display of a correction value is alternately performed additionally internally on the display screen of the target acquisition module or externally on the display screen of the navigation module. This function is supplemented by a simple provision of ballistic characteristic data, such as projectile properties, flight path, and projectile velocity, which are available to the microprocessor, for example, individually stored by the user on a digital memory card, e.g., micro-SD.

The memory card is inserted for this purpose into a shaft, which is closable watertight, in the observation device.

In a particularly simple manner, such data and further individual settings on the observation device can also be performed via a wireless communication, such as Bluetooth, wireless LAN, or similar communication. In this embodiment, the observation device is connected via radio with a PC, laptop, PDA, smartphone, or the like. Via such a wireless communication interface, ballistic correction data can also be transmitted to a telescopic sight, which is also configured for wireless communication. Alternatively, navigation and position data can be transmitted to the above-mentioned external devices.

In particular through the provision of a navigation function, using an observation device according to aspects of the invention in the hunting field, finding the game, or the position of the game at the moment of the shot discharge (called the shot point), is made possible in a particularly advantageous manner. Specifically, the game is often still located so it is well visible before the shot discharge, e.g., in a field at a position which can be measured using the observation device, while it is proverbially swallowed by the vegetation after the kill. Also if the game still flees after the shot, the location coordinates of the shot point are of great significance, since a search or check originates from this position while using tracks and finding this position is of great significance in hunting practice. In particular in darkness or during twilight, finding the shot point is made more difficult and is made possible by the illuminated display of the navigation module. The hunter will not be blinded by an unintentionally lighted external display screen due to the automatic shutdown of the illumination of the external display screen during the measurement or subsequent discharge of the shot.

The observation device according to aspects of the invention is advantageously also usable in forestry, for example, for measuring areas. Areas can be measured out without having to walk along them, in that only the corner points of the area are measured and the location coordinates are ascertained. The ascertained data can be permanently stored on the replaceable memory card and are available for subsequent further evaluations and calculations.

Of course, the use of an observation device according to aspects of the invention is not restricted to the hunting field, but rather applications in boating or airspace monitoring are also possible, in which the position of obstructions, markings, other boats, or flying objects, for example, are of interest.

It is clear that the above-mentioned features and the features still to be explained hereafter on the basis of the drawings do not restrict the scope of protection, but rather merely display an example of the invention.

An exemplary embodiment of the invention is schematically illustrated in the drawing and is explained in greater detail hereafter on the basis of FIG. 1.

Further objects, features and advantages of the present invention will become apparent from the detailed description of preferred embodiments that follows, when considered together with the accompanying figures of drawing.

BRIEF DESCRIPTION OF THE DRAWINGS

FIG. 1 shows an overall illustration of an observation device according to the invention on the example of binocular field glasses.

FIG. 2*a* shows a display screen of the navigation module at the beginning of the navigation and FIG. 2*b* shows the display screen during a navigation procedure.

DETAILED DESCRIPTION OF THE PREFERRED EMBODIMENTS

Figure 3:
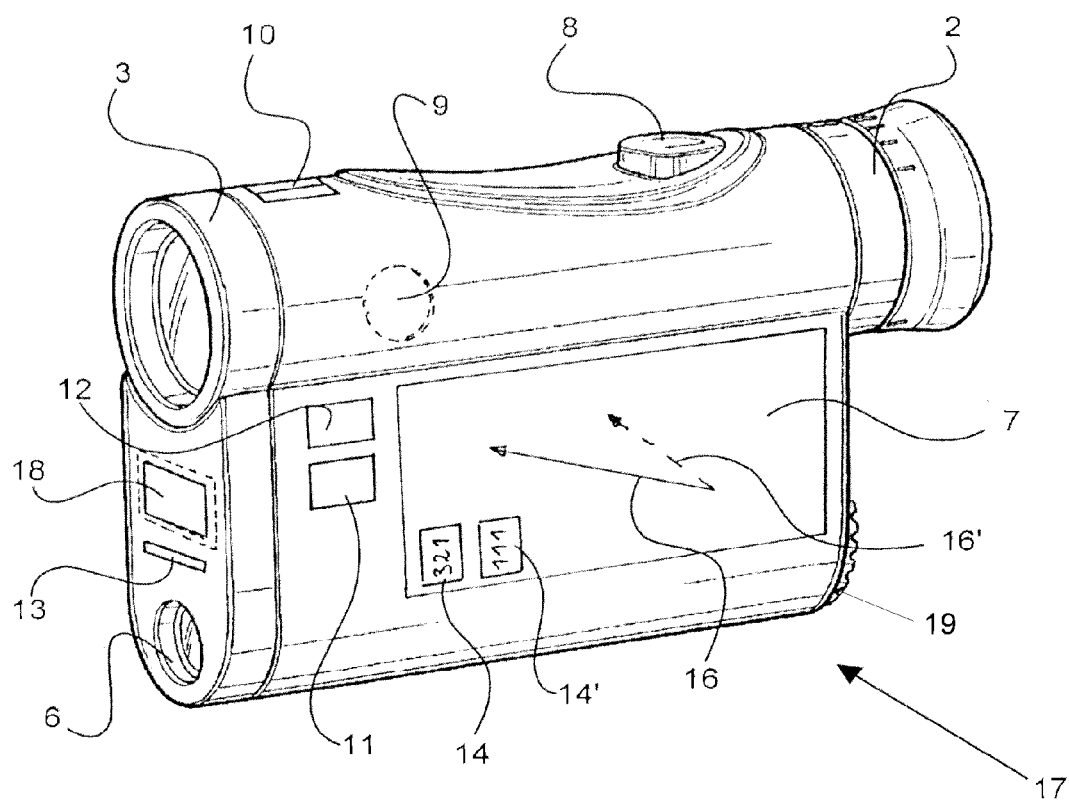
FIG. 3 shows an overall illustration on the example of a monocular laser rangefinder (LRF).

The field glasses 1 have oculars 2, 2', objectives 3, 3', a right housing half 4, and a left housing half 4'. The housing halves 4, 4' are connected via a joint axis 5 for the eye width adjustment. A laser transmitter 6 is arranged between the objectives 3, 3' in extension of the joint axis 5. A display screen 7 is provided externally on the housing half 4 as a component of a navigation module (not shown in greater detail). A first switch 8 and, spaced apart therefrom, a second switch 9 are arranged close to the ocular 2', for a favorable grip, in the housing half 4'. An inclination sensor 10, compass sensor 11, and GPS receiver 12 are schematically shown. A shaft 13 to accommodate a memory card is provided in the region between objective 3' and laser transmitter 6.

FIG. 2*a* schematically shows a display screen 7 at the beginning of navigation. In the upper left region in the illustration, a numeric display 14 having an initial distance to a measured destination is arranged for this purpose, and a numeric display 14' to represent a remaining distance in the navigation function is illustrated underneath. At the beginning of navigation, both numeric displays 14 and 14' have the same numeric value. A compass display 15 having a target directional arrow 16 is also displayed on the display screen 7.

FIG. 2*b* shows the display screen 7 during a navigation procedure. The numeric display 14 still shows the original target distance and the numeric display 14' shown underneath shows the remaining distance to the destination. In the compass display 15, the target directional arrow 16 shows the correct direction to the target and a further arrow 16' shows the direction currently taken (incorrect here) toward the destination.

The monocular laser rangefinder (LRF) 17 shown in FIG. 3 is held vertically for target location purposes and pressed with the ocular 2 on the eye of the user. The range finding to the destination is performed with the aid of a beam emitted by the laser transmitter 6 and from the destination into the objective 3 or a separate laser receiver 18 arranged close to the objective. A schematically shown inclination sensor 10 is integrated in the LRF 17 in the upper housing region. A compass sensor 11 and a GPS receiver 12 are schematically shown on the long side of the LRF 17. The actuation of the functions is performed via a first switch 8, which is arranged on top on the housing, and a lateral second switch 9. A proximity sensor 19 can be arranged in the ocular region which activates the microcomputer unit for the range finding when the observation device is moved toward the eyes. A display screen 7 is arranged in the lateral region of the LRF 17. In the case of the navigation function, the housing is rotated by 90°, so that the display screen 7 is visible from above by the user. In the display screen 7, a target directional arrow 16, for example, is used to represent the correct direction. If the user moves in the navigation mode toward the destination, an additional directional arrow 16' displays the direction which is currently taken. Further information can be displayed in the display screen 7, e.g., the original target distance using numeric display 14 and the distance still remaining to the destination using numeric display 14'.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

LIST OF REFERENCE NUMERALS 1 field glasses
2, 2' ocular
3, 3' objective
4, 4' housing halves
5 joint axis
6 laser transmitter
7 display screen
8 first switch
9 second switch
10 inclination sensor
11 compass sensor
12 GPS receiver
13 shaft for memory card
14, 14' numeric display
15 compass display
16, 16' directional arrow
17 monocular LRF
18 laser receiver

What is claimed is:

1. An optical observation device for target acquisition and navigation having at least one objective, which is configured to be turned toward an object to be observed, and at least one ocular in a housing, which is configured to be turned toward an eye of an observer, wherein the housing has at least one image reversal system, a module configured for range finding, a module configured for location/position determination, and a module configured for determination of a compass direction, comprising:
   an integrated target acquisition module having an optoelectronic rangefinder, a display screen, which can be observed through the ocular, configured for displaying a target mark and a target distance, a GPS position determination device, an electronic compass direction determination device, and a microcomputer unit configured for calculating and storing distance and location coordinates of a targeted destination,
   an integrated navigation module having a display screen, which is arranged externally on the housing, configured for displaying a target direction vector, which is calculated from currently ascertained GPS position coordinates of the observation device, electronic compass data, and stored location coordinates of the targeted destination, and a resulting current target distance, and
   actuating elements, which are arranged on the housing, configured for activating functions of the target acquisition module and the navigation module,
   wherein the integrated navigation module is configured to be activated by at least one of a change in a state of a proximity sensor of the optical observation device or an inclination of the optical observation device as detected using an inclination sensor.

2. An optical observation device according to claim 1, wherein the actuating elements comprise a first pressure switch, which is arranged externally on the housing, a second pressure switch, and the proximity sensor, which is arranged in an ocular region.

3. A method for target acquisition and navigation using the optical observation device according to claim 1, wherein:
   the target acquisition module is activated by a first switch actuation and, with a further switch actuation, the targeted destination is measured using a laser rangefinder and its distance is ascertained,
   location coordinates of the destination are calculated on the basis of current position data, which are ascertained using a GPS module, the target distance, and a direction, which is ascertained using the electronic compass, and are stored together with the target distance in a memory module,
   for navigation, the observation device is removed from the eye, upon which the display screen of the navigation module is activated and the direction to the previously acquired destination is shown and is displayed continuously updated on a basis of current location and compass data of the observation device.

4. An optical observation device according to claim 2, wherein the optical observation device is configured such that when the proximity sensor is actuated, the microcomputer unit activates the target acquisition module, and deactivates the navigation module and the display screen of the navigation module.

5. An optical observation device according to claim 4, wherein when an actuation state of the proximity sensor is changed, the display screen of the navigation module is activated.

6. An optical observation device according to claim 2, wherein the optical observation device is configured such that when at least one of the first pressure switch and the second pressure switch is actuated, the microcomputer unit activates the target acquisition module, and deactivates the navigation module and the display screen of the navigation module.

7. An optical observation device according to claim 6, wherein the optical observation device is configured such that when an actuation state of the at least one of the first pressure switch and the second pressure switch is changed, the display screen of the navigation module is activated.

8. An optical observation device according to claim 7, wherein the optical observation device is configured such that the actuation state of the at least one of the first pressure switch and the second pressure switch is changed by repeated actuation of the at least one of the first pressure switch and the second pressure switch or by a long actuation of the at least one of the first pressure switch and the second pressure switch.

9. An optical observation device according to claim 1, wherein the inclination sensor and further sensors including at least one of an air pressure sensor, an ambient humidity sensor, and a temperature sensor, are integrated in the housing and configured for use in calculating ballistic data, wherein measured data of the inclination sensor and further sensors can be displayed alternately on the display screen of the target acquisition module, the display screen of the navigation module, or a combination thereof.

10. An optical observation device according to claim 9, wherein the microcomputer unit is assigned a shaft, which is closable watertight, to accommodate a digital memory card having ballistic correction values, a wireless communication device for data exchange with external devices, or a combination thereof, the shaft being connected to the microcomputer unit and configured to store ballistic data, store location information, store target data, or store a combination thereof, the wireless communication device configured to transmit ballistic data, transmit location information, transmit target data, or transmit a combination thereof.

11. A method for target acquisition and navigation according to claim 3, wherein a movement direction which is currently taken and a direction toward the destination are graphically displayed as arrow illustrations.

12. A method for target acquisition and navigation according to claim 3, wherein an original target distance to the destination and a current remaining distance to the destination are displayed as numeric values, graphically displayed on the display screen of the navigation module, or a combination thereof.

\* \* \* \* \*